United States Patent [19]

Maassen

[11] 4,208,062
[45] Jun. 17, 1980

[54] LIGHTWEIGHT FIFTH WHEEL MECHANISM

[75] Inventor: Jules B. Maassen, Redmond, Wash.

[73] Assignee: Paccar Inc., Bellevue, Wash.

[21] Appl. No.: 939,676

[22] Filed: Sep. 5, 1978

[51] Int. Cl.² ............................................. B62D 53/12
[52] U.S. Cl. ................................................... 280/434
[58] Field of Search ........................ 280/434, 435, 437

[56] References Cited

U.S. PATENT DOCUMENTS

| | | | |
|---|---|---|---|
| 2,102,821 | 12/1937 | Seyferth | 280/434 |
| 2,663,575 | 12/1953 | Ketel | 280/435 |
| 2,783,899 | 3/1957 | Gutridge | 280/434 |
| 3,013,815 | 12/1961 | Geerds | 280/435 |
| 3,239,240 | 3/1966 | Palmer | 280/434 |
| 3,847,414 | 11/1974 | Madurc | 280/437 |

Primary Examiner—John J. Love
Assistant Examiner—Donn McGiehan
Attorney, Agent, or Firm—Seed, Berry, Vernon & Baynham

[57] ABSTRACT

A fifth wheel mechanism is fabricated from lightweight aluminum in a high strength box configuration. Locking jaws are spring urged toward the king pin receiving opening and are held open by a clip which is removed as the king pin is inserted into the king pin receiving opening. Wedges are automatically pushed between the inserted jaws and skid plates fastened to side plates of the box frame. A cushion block separates the inner king pin mounting jaw to cushion against impact during insertion of the king pin.

4 Claims, 6 Drawing Figures

LIGHTWEIGHT FIFTH WHEEL MECHANISM

BACKGROUND OF THE INVENTION

1. Field of the Invention

This invention pertains to fifth wheel mechanisms and more particularly to an improved lightweight fifth wheel mechanism.

2. Description of the Prior Art

Fifth wheel mechanisms have in general been built unnecessarily heavy. Typical examples are shown in U.S. Pat. Nos. 3,013,815 and 2,663,575. One specific disadvantage of prior art fifth wheel assemblies is that the locking wedges which encircle the king pin frequently must pass through side members of the supporting frame thus weakening the supporting frame. This weakening then requires substantial increases in the amount of metal to make up for the loss in strength unnecessarily increasing the weight of the fifth wheel mechanism. This increase in weight is further compounded by the fact that lower strength structural forms or sections are used in the typical fifth wheel assembly thus again requiring additional metal for strength.

SUMMARY OF THE INVENTION

It is an object of this invention to provide a high-strength, low-weight fifth wheel assembly which is simple to operate and easy to maintain.

It is another object of this invention to provide an improved fifth wheel assembly which has improved king pin locking mechanisms.

Basically these objects are obtained by constructing a fifth wheel assembly in the form of a high-strength box frame with slidable locking jaws mounted in transverse rails and wedging the locking jaws by locking wedges which abut directly against the box frame in a reinforced area. Preferably the locking jaws are spring urged inwardly toward the king pin receiving opening with the locking wedges being spring urged automatically into their wedging position when the king pin is inserted. Preferably, an elastomeric cushion block is provided against the inner king pin receiving jaw to cushion the king pin against high impact loading during insertion of the king pin.

DETAILED DESCRIPTION OF THE PREFERRED EMBODIMENTS

Figure 1:
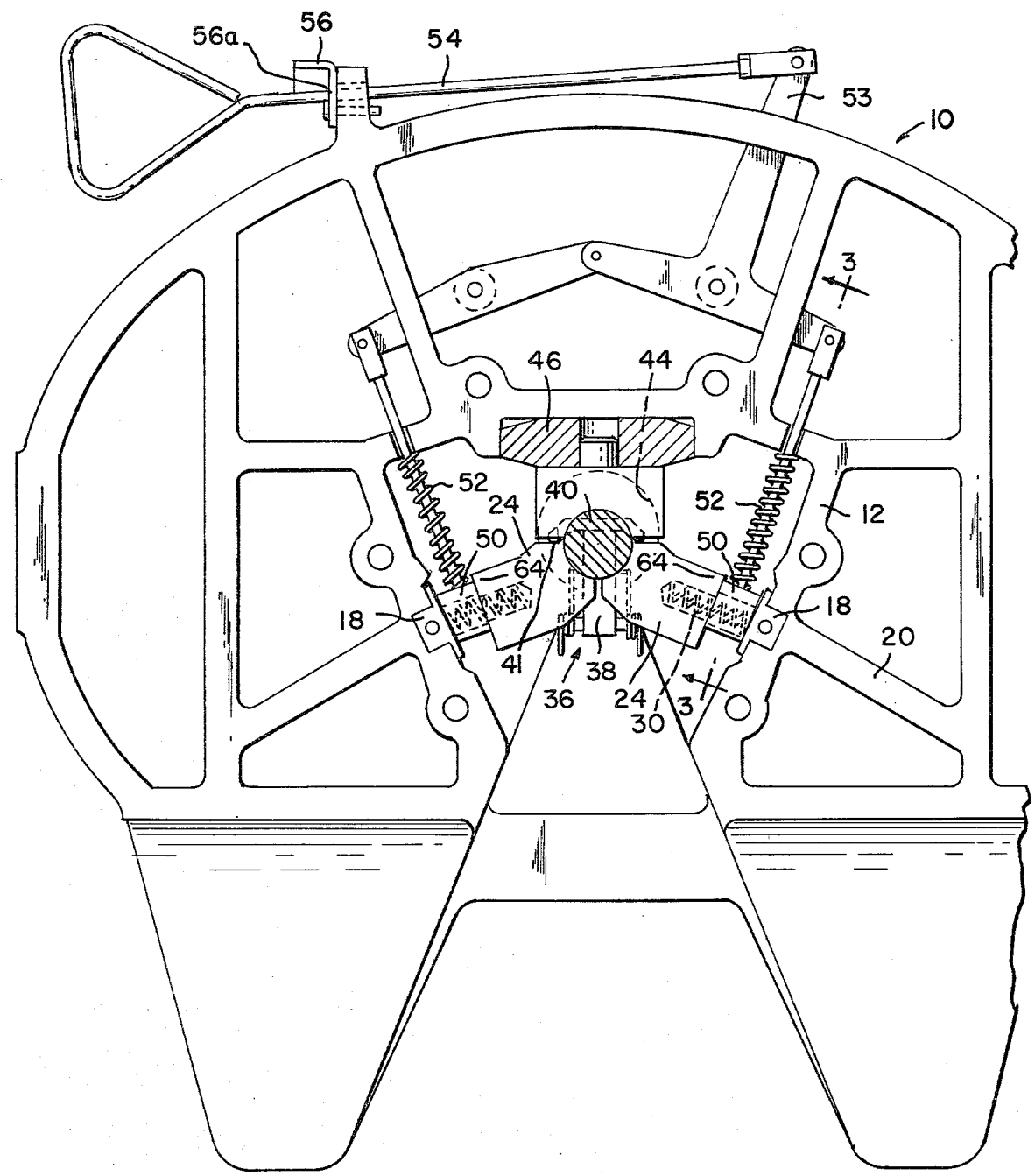
FIG. 1 is a schematic plan of the improved fifth wheel assembly with top plate removed illustrating the jaws in a latching position.
Figure 2:
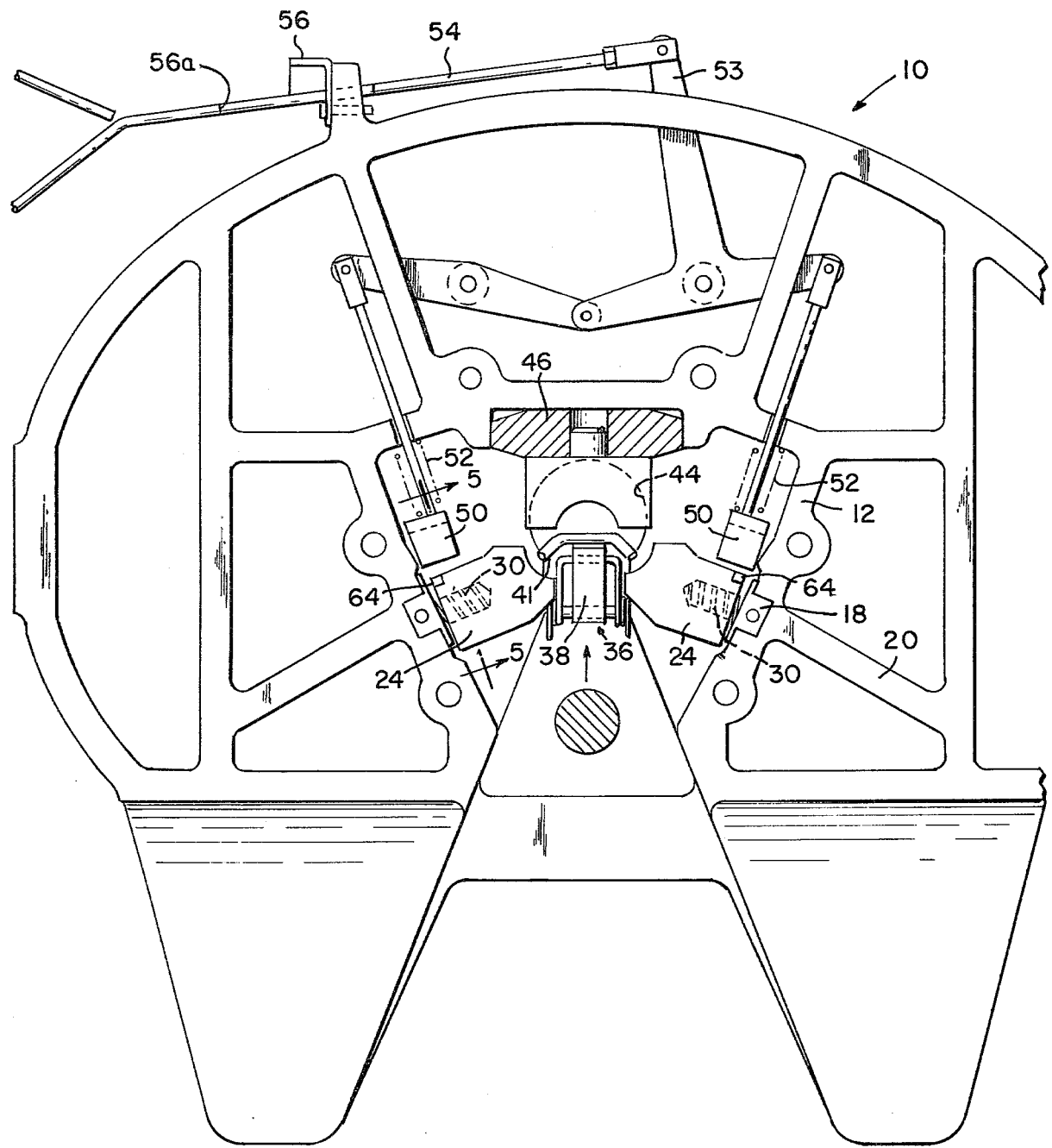
FIG. 2 is another schematic plan with top plate removed illustrating the jaws in a retracted position.
Figure 3:
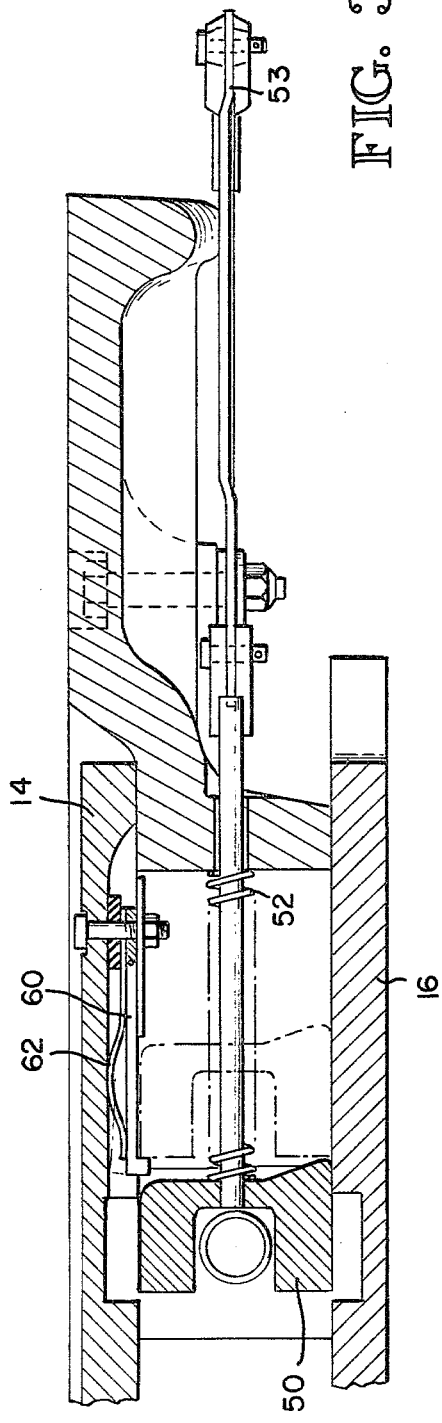
FIG. 3 is a section taken along the line 3—3 of FIG. 1.

As best shown in FIG. 1, the improved fifth wheel assembly includes a box frame 10 having side pieces 12 bolted integrally to a top plate 14 and a bottom plate 16. The top and bottom plates and the vertical frames of the box frame give the box frame considerable strength but with substantially less metal than is used in the conventional types of fifth wheel assemblies. The side pieces 12 include a skid plate 18 with a reinforcing rib 20 perpendicularly connected to the side plate 12 to strengthen the side plate where loading occurs in use.

Figure 4:
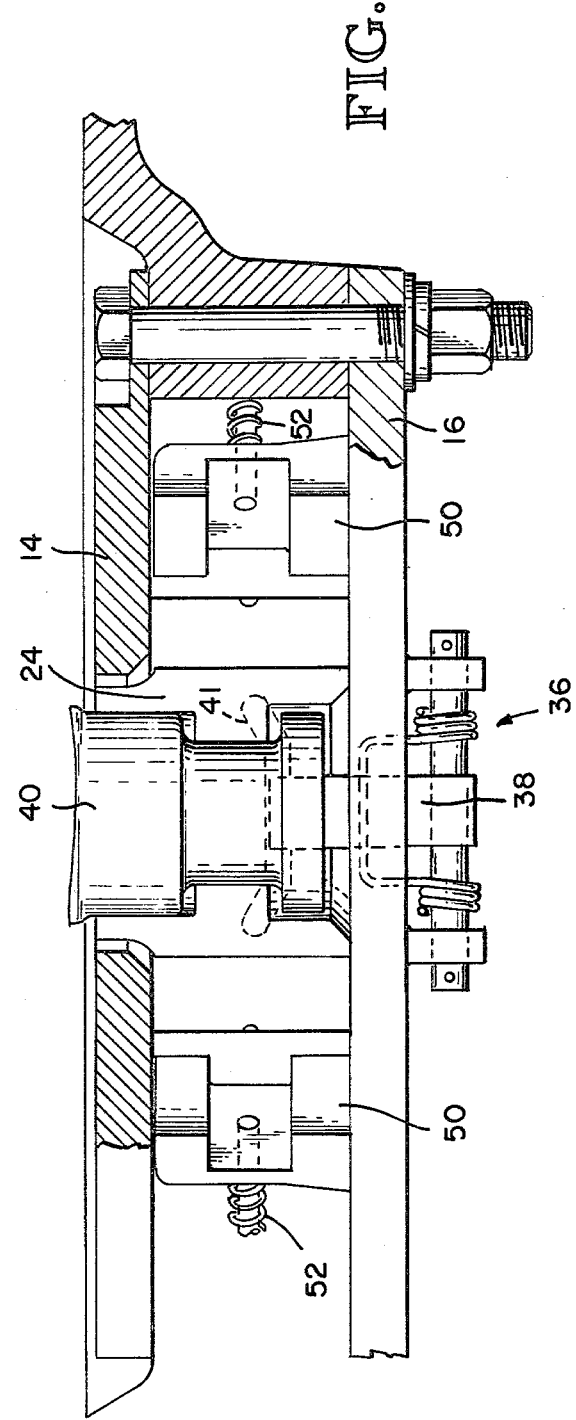
FIG. 4 is an elevational view with parts broken away for clarity.
Figure 5:
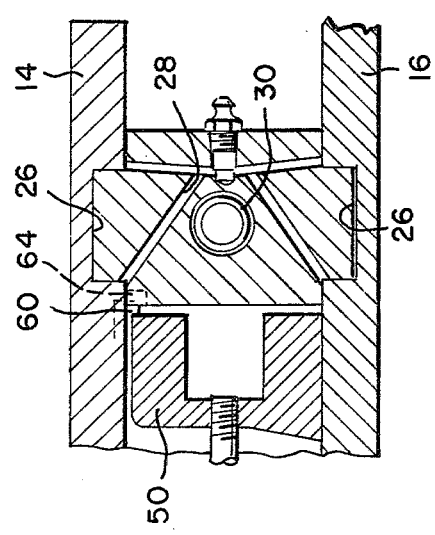
FIG. 5 is a section taken along the line 5—5 of FIG. 2.
Figure 6:
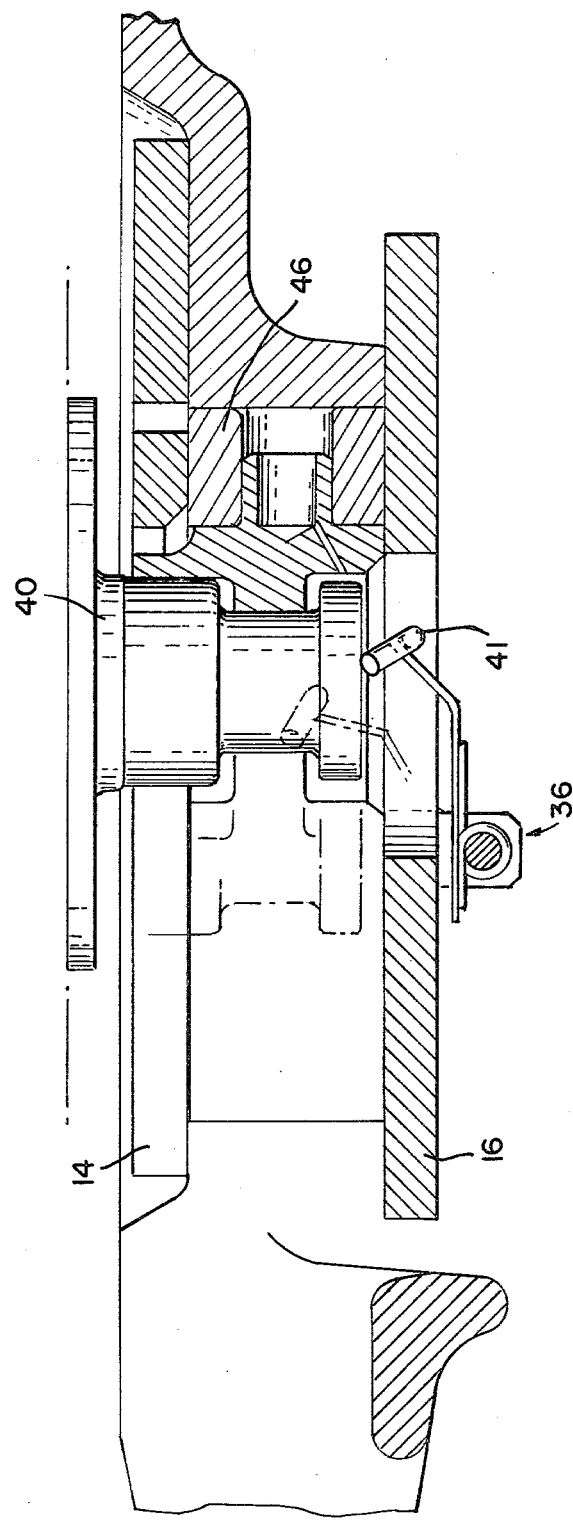
FIG. 6 is a fragmentary side elevation.

Mounted in the box frame are rear locking jaws 24 which are slidably carried in upper and lower tracks 26. The tracks or guides are lubricated by lubrication passages 28. Springs 30 urge the locking jaws toward a king pin receiving opening. As best shown in FIGS. 4 and 6, the jaws engage the entire length of the king pin including its opposite ends and reduced central portion. This reduces the bending moment on the king pin and thus increases its load carrying strength.

The locking jaws are held open by a jaw spacer assembly 36 having a plate 38 and outwardly extending spacer arms 41. The spacer arms are in contact with the locking jaws to hold the locking jaws open until a king pin 40 pushes against the plate 38 retracting the arms 41 and allowing the jaws to slide inwardly about the king pin. The king pin is nested against a forward jaw 44 that is held onto the box frame by an elastomeric cushion block 46. Since the impact loading on insertion of a king pin into the king pin receiving opening is as much as ten times the loading when pulling or backing the trailer this cushion block absorbs much of the impact allowing a further reduction in the amount of metal previously used to absorb the impact.

The locking jaws are held in engagement with the king pin by locking wedges 50 that are slidably positioned against the jaws and the skid plate 18. Springs 52 urge the wedges into their wedging position and the wedges are retracted by a release handle mechanism 53. The handle mechanism includes a handle 54 which can be automatically latched into the locking position by a latch 56 which seats by gravity against a notch 56a to prevent outward movement of the handle 54.

The locking wedges are held temporarily in a retracted position when the handle 54 is moved to the left as viewed in FIG. 1 by keepers 60 which are pushed down in front of the locking wedges by spring clips 62. This allows the king pin to be removed from the king pin receiving opening by pulling the tractor and thus the fifth wheel assembly away from the king pin. The king pin as it leaves the opening pushes open the jaws 24 and the spacer arms 41 move up preventing the jaws from again closing. As the jaws are retracted cams 64 engage under the keepers 60 lifting them and allowing the locking wedges to again be pushed against the side surfaces of the locking jaws. Thus as the locking jaws are again returned around a king pin in the opening the locking wedges will automatically slide into place.

In operation, to uncouple the king pin, the latch 56 is raised lifting the latch out of the notch 56a on the handle 54 and allowing the handle 54 to then be pulled outwardly. Pulling on the handle causes both locking wedges 50 to be retracted with the spring-loaded wedge keepers keeping the locking wedges in the retracted position. The tractor pulls forward, causing the rear jaws to be pushed against the stationary king pin. The jaws slide out on their guideways to let the king pin through. Simultaneously, the cams on the rear jaws release the locking wedges. The jaw spacer assembly follows the king pin keeping the rear jaws in the open position until the next coupling is made.

During the next coupling, the tractor is backed under the trailer to engage the king pin. The king pin depresses the jaw spacer assembly freeing the rear jaws and the front jaw hits the king pin. The shock is dampened by the elastomeric cushion block 46. The spring-loaded rear jaws then grip the king pin and the spring-loaded locking wedges slip between the rear jaws and the skid plate wall. The release handle is automatically pulled inward and the safety latch 56 drops by gravity locking the release handle.

While the preferred embodiment of the invention has been illustrated and described, it should be understood that variations will be apparent to one skilled in the art without departing from the principles herein. Accordingly, the invention is not to be limited to the specific form illustrated in the drawing.

I claim:

1. A fifth wheel assembly comprising a high-strength box frame having aluminum side members joined with top and bottom high-strength plates, bolts removably clamping the top and bottom plates together against the aluminum side members in compression to sandwich the softer aluminum between the higher strength plates and for easy removal of the top plate for maintenance, a rearwardly opening king pin receiving opening in said box frame, generally transversely aligned guide tracks in said top and bottom plates, said guide tracks facing each other and positioned in alignment with said king pin receiving opening, a pair of jaws slidably disposed in said guide tracks, said box frame having vertical side plates confronting the guide tracks, said jaws including spring means urging the jaws away from said side plates and toward said king pin receiving opening, locking wedges positioned between said jaws and said side plates for locking the jaws into the king pin receiving opening and being retractable out of the path of the jaws for retracting the jaws to open the king pin receiving opening and allow removal of the king pin, said side plates each including a hardened skid plate engaged by said locking wedges, means for retracting said locking wedges, spacer means for holding the jaws outwardly and being engageable by the king pin to be moved away from the jaws and allow the jaws to close on the king pin.

2. The fifth wheel assembly of claim 1, said box frame including a rib extending perpendicular to said side plate in alignment with said guide tracks for supporting in compression the force transmitted by said jaws.

3. The fifth wheel assembly of claim 1, including a front king pin coupler and an elastomeric cushion block separating said front king pin coupler from said box frame to absorb impact loading on the king pin.

4. The fifth wheel assembly of claim 1, including spring biased keepers engageable with the locking wedges and operable to latch the locking wedges in retractable positions, and cam surfaces on said jaws for lifting said keepers to release said locking wedges, and spring means for urging the locking wedges toward said jaws for automatically seating the wedges when the jaws move against the king pin.

* * * * *